(12) United States Patent
Shih

(10) Patent No.: US 7,447,892 B2
(45) Date of Patent: Nov. 4, 2008

(54) OPERATING SYSTEM ACTIVATION KEY EMBEDDING HANDLING METHOD AND SYSTEM

(75) Inventor: Wh Shih, Taipei (TW)

(73) Assignee: Inventec Corporation (TW)

( * ) Notice: Subject to any disclaimer, the term of this patent is extended or adjusted under 35 U.S.C. 154(b) by 419 days.

(21) Appl. No.: 11/372,882

(22) Filed: Mar. 10, 2006

(65) Prior Publication Data

US 2007/0214346 A1 Sep. 13, 2007

(51) Int. Cl.
*G06F 9/00* (2006.01)
(52) U.S. Cl. .......................................... 713/1
(58) Field of Classification Search ............... 713/1
See application file for complete search history.

(56) References Cited

U.S. PATENT DOCUMENTS 6,006,190 A * 12/1999 Baena-Arnaiz et al. ........ 705/1
6,463,535 B1 * 10/2002 Drews ......................... 713/176
6,595,856 B1 * 7/2003 Ginsburg et al. ............... 463/29
7,383,432 B1 * 6/2008 Barnes et al. ................. 713/151

* cited by examiner

*Primary Examiner*—Rehana Perveen
*Assistant Examiner*—Eric Chang
(74) *Attorney, Agent, or Firm*—Peter F. Corless; Steven M. Jensen; Edwards Angell Palmer & Dodge LLP

(57) ABSTRACT

An operating system activation key embedding handling method and system is proposed, which is designed for use with a computer platform for providing the computer platform an operating system activation key embedding handling function, which is characterized by the capability of allowing a computer manufacturer to utilize one single type of BIOS (Basic Input/Output System) chip for implementing the embedding of SLP (System Locked Preinstallation) activation key in various different models of computer platforms with different hardware configurations, without requiring the manufacturer to devise different variations of BIOS chips as in the case of the prior art. This feature allows the implementation of SLP for product activation to be more flexible than the prior art, thus allowing the manufacture of computer to be more cost-effective.

10 Claims, 2 Drawing Sheets

OPERATING SYSTEM ACTIVATION KEY EMBEDDING HANDLING METHOD AND SYSTEM

BACKGROUND OF THE INVENTION

1. Field of the Invention

This invention relates to information technology (IT), and more particularly, to an operating system activation key embedding handling method and system which is designed for use in conjunction with a computer platform that runs on an operating system having a product activation function, and which is used to provide the computer platform with an operating system activation key embedding handling function that allows the manufacturer of the computer platform to embed an activation key into the computer platform during manufacture, such that during actual operation, the computer platform is able to use the activation key for product activation of the operating system preinstalled therein.

2. Description of Related Art

Presently, windows-based operating systems, such as Microsoft Windows XP and Server 2003, are equipped with a product activation function that requires the user to carry out an activation process via Internet or telephone call for activating the operating system after being installed on a personal computer. If the user didn't carry out the product activation process, or the same copy of operating system has been installed on another computer platform, then the installed operating system will be disabled to make the computer platform inoperable by the user. The product activation function can thus help prevent the same copy of operating system from being unrestrictedly installed on an unlimited number of computer platforms.

In the computer industry, PC manufacturers typically offer their computer products with a preinstalled operating system (such as such as Microsoft Windows XP), and utilize Microsoft's SLP (System Locked Preinstallation) technology for product activation of the preinstalled operating system. The SLP technology uses a predetermined activation key whose value corresponds to the hardware configuration of a PC, and embeds this activation key to the PC's BIOS (Basic Input/Output System) module, typically in a predefined BIOS storage area called "F Segment", such that at the startup of the PC, the operating system can access to the BIOS's F Segment area to retrieve the SLP activation key and compare it to a computed number that is obtained based on the current hardware configuration of the PC. If the SLP activation key is a match to the number, then the operating system is activated to run on the computer platform; otherwise, if unmatched, the operating system is disabled to make the computer platform inoperable by the user.

In practical applications, however, different computer platforms from different manufacturers typically have different hardware configurations based on different customer specifications, and therefore have different schemes in the use of the BIOS to embed the SLP activation key. For this sake, the computer industry needs to set different specifications for the implementation of BIOS to store the SLP activation key, and thus requires the design of many different variations of BIOS chips for assembly to different models of computer platforms having different hardware configurations. This practice is undoubtedly quite uneconomical and thus very costly to implement.

SUMMARY OF THE INVENTION

It is therefore an objective of this invention to provide an operating system activation key embedding handling method and system which allows the computer manufacturer to utilize one single type of BIOS chip for implementing the embedding of SLP activation key in computer platforms having different hardware configurations.

The operating system activation key embedding handling method and system according to the invention is designed for use in conjunction with a computer platform that runs on an operating system having a product activation function, and which is used to provide the computer platform with an operating system activation key embedding handling function that allows the manufacturer of the computer platform to embed an activation key into the computer platform during manufacture, such that during actual operation, the computer platform is able to use the activation key for product activation of the operating system preinstalled therein.

In conception, the operating system activation key embedding handling method according to the invention comprises: (1) in a pre-manufacture stage, defining an activation-key storage area in the startup control unit; and storing a set of activation key access commands, including an activation-key read command and an activation-key write command, in a memory area associated with the system control unit; (2) in a manufacture stage, responding to a manufacturer operated activation-key setting event during manufacture of the computer platform by executing the activation-key write command stored in the associated memory area of the system control unit to thereby embed a manufacturer-supplied activation key in the system control unit; and (3) in an end user stage, responding to each startup event on the computer platform by executing the activation-key read command stored in the associated memory area of the system control unit to thereby retrieve the embedded activation key in the system control unit; and then transferring the retrieved activation key from the system control unit to the predefined activation-key storage area in the startup control unit, where the activation key can be accessed by the operating system of the computer platform at startup of the computer platform for product activation purpose.

In architecture, the operating system activation key embedding handling system is based on an object-oriented component model which comprises: (A) an activation-key storage area defining module, which is used to define an activation-key storage area in the startup control unit; (B) an activation-key read/write command storage module, which is used to store a set of activation key access commands, including an activation-key read command and an activation-key write command, in a memory area associated with the system control unit; (C) an activation-key factory-setting module, which is capable of responding to a manufacturer-operated activation-key setting event during manufacture of the computer platform by executing the activation-key write command stored in the activation-key read/write command storage module to thereby embed a manufacturer-supplied activation key in the system control unit; (D) an activation-key retrieval module, which is capable of responding to each startup event on the computer platform by executing the activation-key read command stored in the activation-key read/write command storage module to thereby retrieve the embedded activation key in the system control unit; and (E) an activation-key transferring module, which is capable of transferring the activation key retrieved by the activation-key retrieval module from the system control unit to the predefined activation-key storage area in the startup control unit, where the activation key can be accessed by the operating system of the computer platform at startup of the computer platform for product activation purpose.

The operating system activation key embedding handling method and system according to the invention is characterized by the capability of allowing a computer manufacturer to utilize one single type of BIOS chip for implementing the embedding of SLP activation key in various different models of computer platforms with different hardware configurations, without requiring the manufacturer to devise different variations of BIOS chips as in the case of the prior art. This feature allows the implementation of SLP for product activation to be more flexible than the prior art, thus allowing the manufacture of computer to be more cost-effective.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The operating system activation key embedding handling method and system according to the invention is disclosed in full details by way of preferred embodiments in the following with reference to the accompanying drawings.

Figure 1:
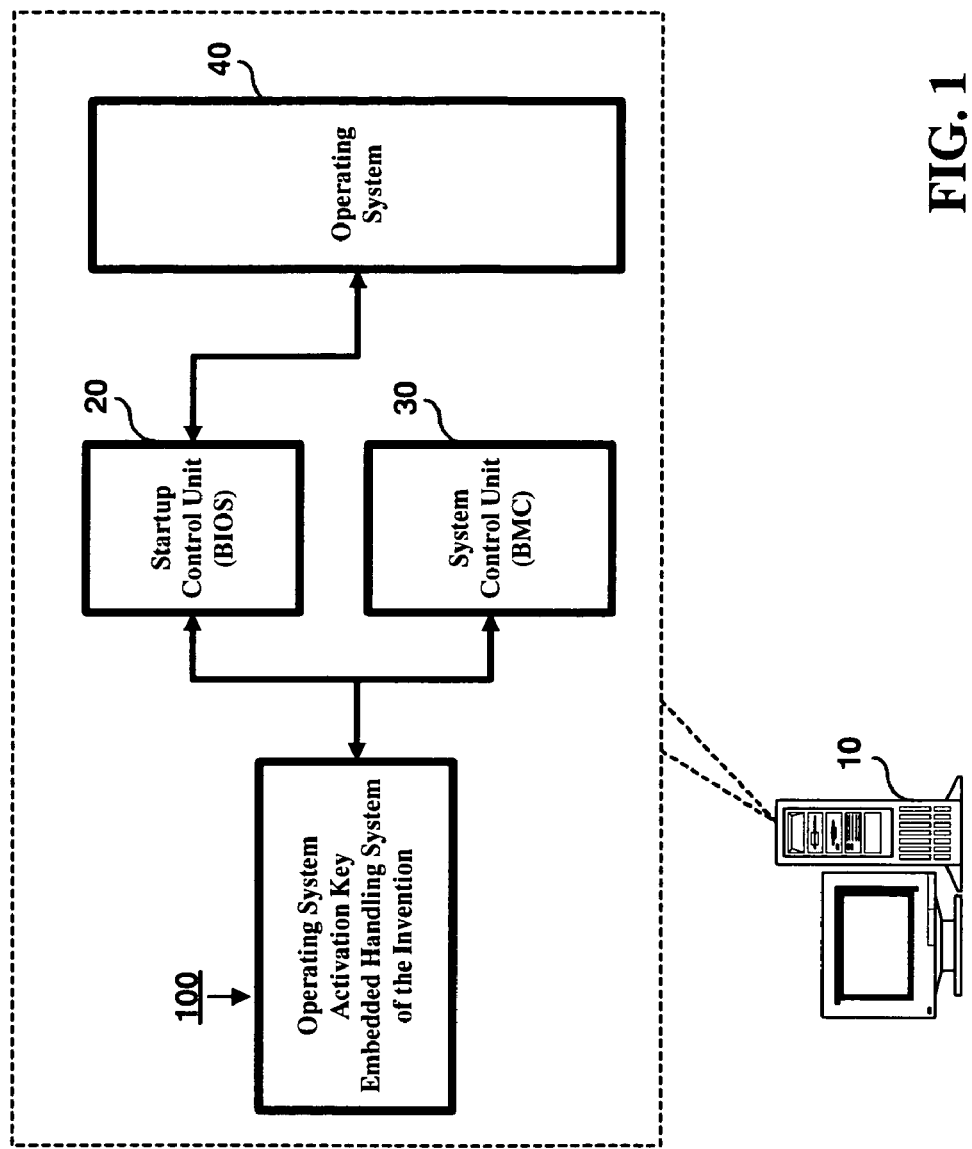
FIG. 1 is a schematic diagram showing the application of the operating system activation key embedding handling system of the invention with a computer platform.

FIG. 1 is a schematic diagram showing the application of the operating system activation key embedding handling system according to the invention which is encapsulated in the block indicated by the reference numeral 100. As shown, the operating system activation key embedding handling system of the invention 100 is designed for use in conjunction with a computer platform 10, such as a desktop computer, a notebook computer, or a network server, that runs on an operating system 40 with a product activation function, such as Microsoft Windows XP or Server 2003, for the purpose of providing the computer platform 10 with an operating system activation key embedding handling function that allows the manufacturer of the computer platform 10 to embed an activation key into the computer platform 10 during manufacture. During actual utilization of the computer platform 10, the operating system 40 preinstalled on the computer platform 10 is able to retrieve and use the embedded activation key for product activation of the operating system 40.

In actual implementation, it is a prerequisite that the computer platform 10 should be equipped with a startup control unit 20 and a system control unit 30, where the startup control unit 20 is for example a BIOS (Basic Input/Output System) module, and the system control unit 30 is for example a server-specific BMC (Baseboard Management Controller) module.

Figure 2:
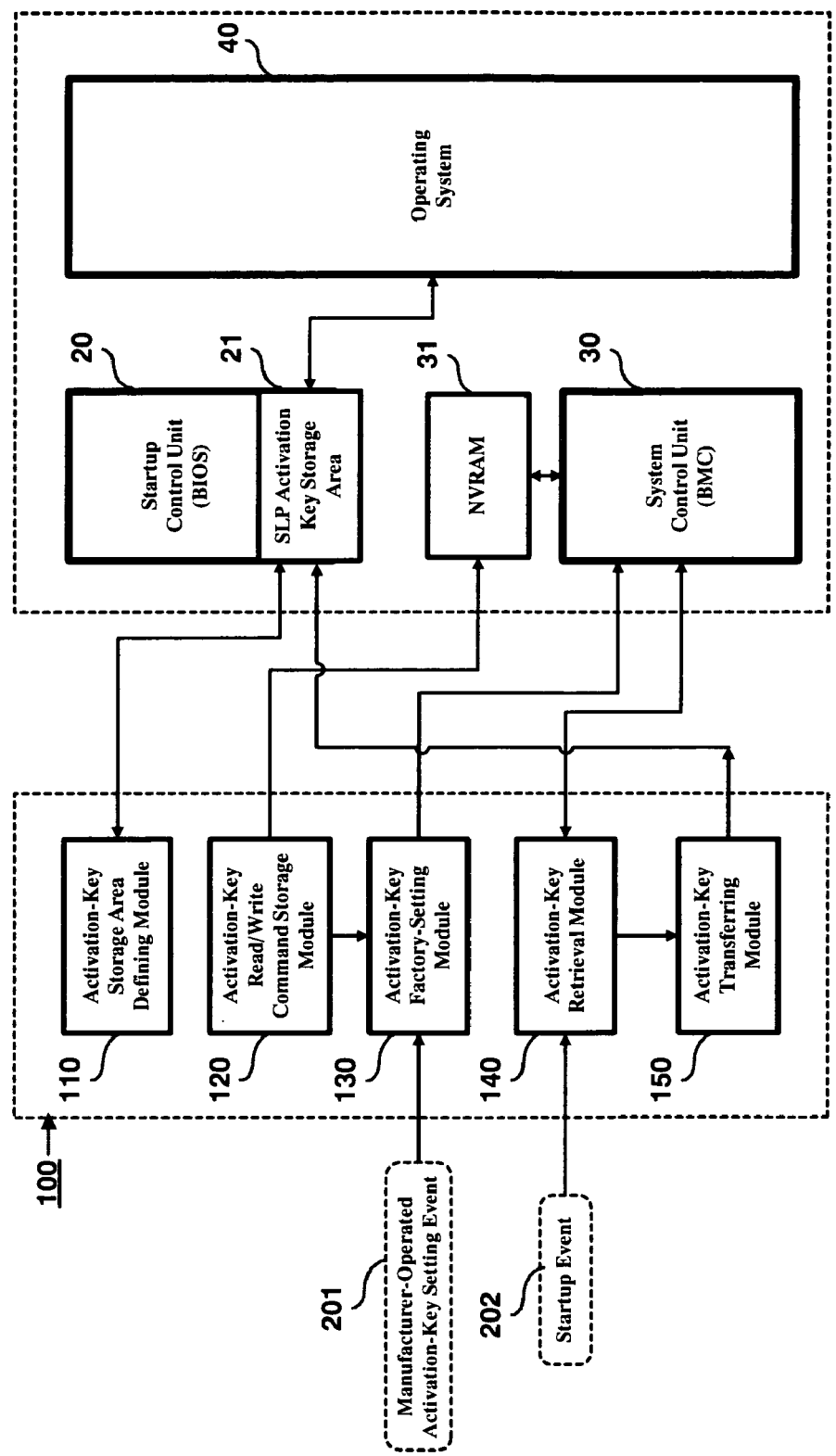
FIG. 2 is a schematic diagram showing the object-oriented component model of the operating system activation key embedding handling system of the invention.

As shown in FIG. 2, in architecture, the operating system activation key embedding handling system of the invention 100 is based on an object-oriented component model which comprises: (A) an activation-key storage area defining module 110; (B) an activation-key read/write command storage module 120; (C) an activation-key factory-setting module 130; (D) an activation-key retrieval module 140; and (E) an activation-key transferring module 150. Firstly, the respective attributes and behaviors of the constituent components 110, 120, 130, 140, 150 of the operating system activation key embedding handling system of the invention 100 are described in details in the following The activation-key storage area defining module 110 is a predefined storage area 21 (hereinafter referred to as "SLP activation-key storage area") in the memory space of the BIOS startup control unit 20, which is predefined by the BIOS designer for storage of the data of an activation key, such as an SLP (System Locked Preinstallation) activation key. This SLP activation-key storage area 21 has a length of 2 to 3 words for storing an SLP activation key that is to be supplied by the manufacturer of the computer platform 10.

The activation-key read/write command storage module 120 is a predefined memory area in a memory unit, such as an NVRAM (Non-Volatile Random-Access Memory) module 31, that is associated with the BMC system control unit 30; and which is used to prestore a set of SLP activation-key access control commands, including an SLP activation-key read command (represented by BMC_OEM_SLP_READ) and an SLP activation-key write command (represented BMC_OEM_SLP_WRITE).

The activation-key factory-setting module 130 is capable of responding to a manufacturer-initiated activation-key setting event 201 during manufacture of the computer platform 10 by executing the activation-key write command BMC_OEM_SLP_WRITE stored in the activation-key read/write command storage module 120 to thereby write a manufacturer-supplied activation key (i.e., a unique SLP activation key corresponding to the particular hardware configuration of the computer platform 10) into the BMC system control unit 30, for the purpose of embedding the SLP activation key in the BMC system control unit 30.

The activation-key retrieval module 140 is capable of responding to each startup event 202 on the computer platform 10 by executing the activation-key read command BMC_OEM_SLP_READ stored in the activation-key read/write command storage module 120 to thereby retrieve the SLP activation key that was factory-stored in the system control unit 30 by the manufacturer using the activation-key factory-setting module 130.

The activation-key transferring module 150 is capable of transferring the SLP activation key retrieved by the activation-key retrieval module 140 from the BMC system control unit 30 to the activation-key storage area 21 predefined in the startup control unit 20 (i.e., the "F Segment" in BIOS), such that the SLP activation key can be accessed by the operating system 40 of the computer platform 10 at startup for comparison in a product activation process to determine whether the operating system 40 is legally authorized to be activated for running on the computer platform 10.

The following is a detailed description of a practical application example of the operating system activation key embedding handling system of the invention 100 during actual operation. The utilization is divided into 3 stages: (1) a pre-manufacture stage (i.e., the design and manufacture of BIOS); (2) a manufacture stage (i.e., the manufacture of the computer platform 10); and (3) an end user stage.

In the first stage of BIOS design and manufacture, for each BIOS chip (i.e., the BIOS startup control unit 20), the BIOS designer can utilize the activation-key storage area defining module 110 to define an SLP activation-key storage area 21 in the memory space of the BIOS startup control unit 20, which has a length of 2 to 3 words, for use to store an SLP activation key that is to be supplied by the manufacturer of the computer platform 10 during the second stage of computer manufacture. In addition, the activation-key read/write command storage module 120 is used to store a set of SLP activation-key access control commands, including an SLP activation-key read command BMC_OEM_SLP_READ and an SLP activation-key write command BMC_OEM_SLP_WRITE into the NVRAM module 31 of the BMC system control unit 30.

Subsequently, in the computer manufacture stage (i.e., the manufacture of the computer platform 10), the computer manufacturer needs to utilize the activation-key factory-setting module 130 to initiate an activation-key setting event 201, wherein an SLP activation key corresponding to the hardware configuration of the computer platform 10 is inputted, which then causes the activation-key factory-setting module 130 to respond by executing the activation-key write command BMC_OEM_SLP_WRITE stored in the activation-key read/write command storage module 120 to thereby write the manufacturer-inputted data of the SLP activation key into the BMC system control unit 30.

Finally, in the end user stage, whenever the user starts the computer platform 10 (i.e., initiating a startup event 202 on the computer platform 10), it causes the activation-key retrieval module 140 to respond by executing the activation-key read command BMC_OEM_SLP_READ stored in the activation-key read/write command storage module 120 to thereby retrieve the SLP activation key that was previously factory-embedded in the BMC system control unit 30 by the manufacturer using the activation-key factory-setting module 130. Next, the activation-key transferring module 150 is activated to transfer the retrieved SLP activation key from the BMC system control unit 30 to the activation-key storage area 21 in the BIOS startup control unit 20 (i.e., the "F Segment" in BIOS), such that the SLP activation key can be accessed by the preinstalled operating system 40 on the computer platform 10 at startup for comparison in a product activation process to determine whether the operating system 40 is legally authorized to be activated for running on the computer platform 10.

In the product activation process, the operating system 40 first detects the hardware configuration of the computer platform 10 and then compute for a number by using a predefined algorithm based on the detected hardware configuration. If the computed number is a match to the SLP activation key, then the operating system 40 is activated to run on the computer platform 10; otherwise, if unmatched, the operating system 40 is disabled to make the computer platform 10 inoperable by the user.

In conclusion, the invention provides an operating system activation key embedding handling method and system for use with a computer platform, which is characterized by the capability of allowing a computer manufacturer to utilize one single type of BIOS chip for implementing the embedding of SLP activation key in various different models of computer platforms with different hardware configurations, without requiring the manufacturer to devise different variations of BIOS chips as in the case of the prior art. This feature allows the implementation of SLP for product activation to be more flexible than the prior art, thus allowing the manufacture of computer to be more cost-effective. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An operating system activation key embedding handling method for use on a computer platform of the type having a startup control unit and a system control unit for providing the computer platform with an operating system activation key embedding handling function, which comprises:

in a pre-manufacture stage, defining an activation-key storage area in the startup control unit; and storing a set of activation key access commands, including an activation-key read command and an activation-key write command, in a memory area associated with the system control unit;

in a manufacture stage, responding to a manufacturer operated activation-key setting event during manufacture of the computer platform by executing the activation-key write command stored in the associated memory area of the system control unit to thereby embed a manufacturer-supplied activation key in the system control unit; and in an end user stage, responding to each startup event on the computer platform by executing the activation-key read command stored in the associated memory area of the system control unit to thereby retrieve the embedded activation key in the system control unit; and then transferring the retrieved activation key from the system control unit to the predefined activation-key storage area in the startup control unit, where the activation key can be accessed by the operating system of the computer platform at startup of the computer platform for product activation purpose.

2. The operating system activation key embedding handling method of claim 1, wherein the computer platform is a desktop computer, a notebook computer, or a network server.

3. The operating system activation key embedding handling method of claim 1, wherein the startup control unit is a BIOS (Basic Input/Output System) module.

4. The operating system activation key embedding handling method of claim 1, wherein the system control unit is a server-specific BMC (Baseboard Management Controller) module.

5. The operating system activation key embedding handling method of claim 1, wherein the operating system is a window-based operating system, and the activation key is an SLP (System Locked Preinstallation) compliant activation key.

6. An operating system activation key embedding handling system for use with a computer platform of the type having a startup control unit and a system control unit for providing the computer platform with an operating system activation key embedding handling function, which comprises:

an activation-key storage area defining module, which is used to define an activation-key storage area in the startup control unit;

an activation-key read/write command storage module, which is used to store a set of activation key access commands, including an activation-key read command and an activation-key write command, in a memory area associated with the system control unit;

an activation-key factory-setting module, which is capable of responding to a manufacturer-operated activation-key setting event during manufacture of the computer platform by executing the activation-key write command stored in the activation-key read/write command storage module to thereby embed a manufacturer-supplied activation key in the system control unit;

an activation-key retrieval module, which is capable of responding to each startup event on the computer platform by executing the activation-key read command stored in the activation-key read/write command storage module to thereby retrieve the embedded activation key in the system control unit; and an activation-key transferring module, which is capable of transferring the activation key retrieved by the activation-key retrieval module from the system control unit to the predefined activation-key storage area in the startup control unit, where the activation key can be accessed by the operating system of the computer platform at startup of the computer platform for product activation purpose.

7. The operating system activation key embedding handling system of claim 6, wherein the computer platform is a desktop computer, a notebook computer, or a network server.

8. The operating system activation key embedding handling system of claim 6, wherein the startup control unit is a BIOS (Basic Input/Output System) module.

9. The operating system activation key embedding handling system of claim 6, wherein the system control unit is a server-specific BMC (Baseboard Management Controller) module.

10. The operating system activation key embedding handling system of claim 6, wherein the operating system is a window-based operating system, and the activation key is an SLP (System Locked Preinstallation) compliant activation key.

* * * * *